Apr. 10, 1923.

W. P. HAMMOND 1,451,257

PRESSURE GAUGE

Filed June 20, 1911

Attest:

Inventor:

Patented Apr. 10, 1923.

1,451,257

UNITED STATES PATENT OFFICE.

WILLIAM P. HAMMOND, OF PASSAIC, NEW JERSEY, ASSIGNOR TO A. SCHRADER'S SON, INCORPORATED, OF BROOKLYN, NEW YORK, A CORPORATION OF NEW YORK.

PRESSURE GAUGE.

Application filed June 20, 1911. Serial No. 634,225.

*To all whom it may concern:*

Be it known that I, WILLIAM P. HAMMOND, a citizen of the United States, residing in the city and county of Passaic, in the State of New Jersey, have invented certain new and useful Improvements in Pressure Gauges, and do hereby declare that the following is a full, clear, and exact description of the same, reference being had to the annexed drawings, which form a part of this specification.

My invention comprehends certain improvements in pressure gauges particularly designed for use in measuring the fluid pressure in pneumatic tires, although not restricted to this particular use. The object of my invention is to provide an improved construction of gauge adapted for momentary application to the valve of a pneumatic tire to indicate the pressure within the tire and maintain such indication after the gauge has been removed from the valve and until the same has been reset.

In the accompanying drawings I have illustrated certain embodiments of my invention showing the general construction of the same.

The same reference numerals are applied to and denote corresponding parts in the several views.

Figure 1:
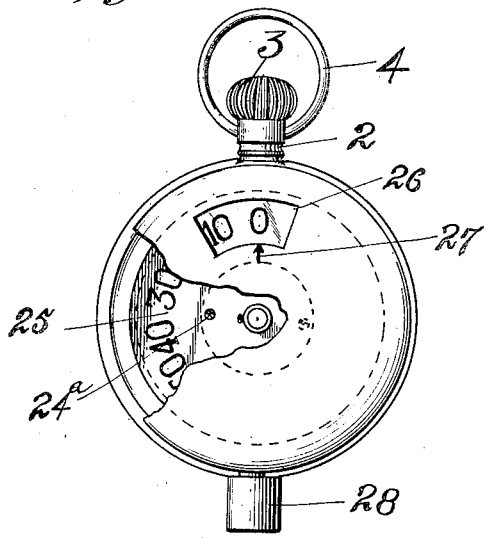
Figure 1 is a view in elevation, partly broken away, of one form of the invention.
Figure 2:
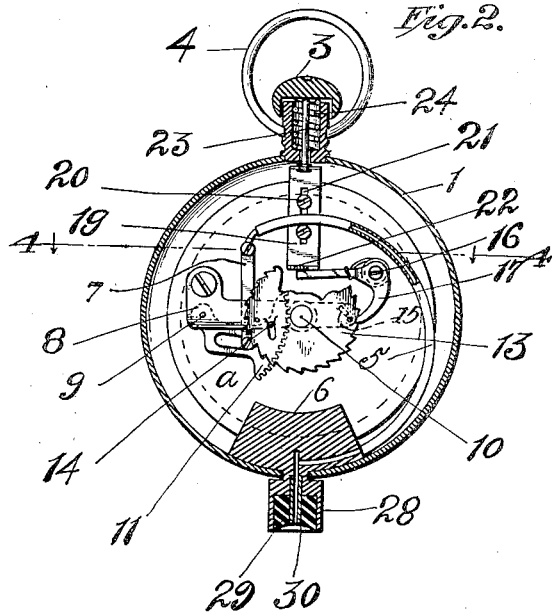
Fig. 2 is a vertical section through the pressure gauge.

The gauge mechanism is housed within a casing 1 which is in the form of a watch case provided with the usual stem 2, crown cap 3 and ring 4.

*a* indicates a bed plate upon which the gauge mechanism is mounted, 5 indicates the usual form of Bourdon tube mounted at one end in a fixed block 6, and pivotally connected at its other end to an adjusting link 7. 8 indicates a bridge piece or support for the shafts 9 and 10 upon which are mounted the rack 11 and pinion 12 all of which are of usual and well known construction and need not be more fully described.

Upon the shaft 10 is mounted a toothed wheel or ratchet 13. This wheel is provided with a depending limiting stop 14 which engages a similar stop 15 on the bridge-piece 8 to prevent the indicating dial or hand from overriding itself while being reset. 16 indicates a shaft mounted upon the plate *a* which serves as a support for the pawl 17, the latter under tension of spring 18 normally engages the ratchet wheel 13 so as to trap the same in indicating position when operated.

19 indicates a plate slidably mounted upon the base plate *a* by means of suitable guide pins or screws 20 operating in slot 21. The end of this plate is turned upward at 22 and this end engages the free end of the pawl 17 so that when the plate is actuated the pawl will be thrown out of engagement with the wheel 13. The sliding plate 19 is connected to the crown 3 by means of a stem 23. Surrounding the stem is a spring 24 which bears against the crown 3 and holds the engaging end 22 of plate 19 in its retracted position so that the pawl 17 will be in engaging position with the ratchet wheel 13.

Mounted upon the ratchet wheel 13 by means of suitable screws 24ª is the dial plate 25 provided with indicating numerals or graduations. An opening 26 is provided in the case 1 through which the pressure indication may be read. 27 is an indicator arrow or mark.

28 indicates the valve engaging end of the gauge and is provided with a rubber seat 29 and a valve depressor 30 which is designed to fit against the valve casing of a tire and depress and open the valve to permit the air pressure to enter the gauge as may be readily understood.

Figure 3:
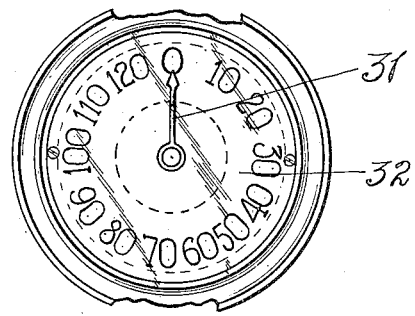
Figure 3 is a detail of a modification.
Figure 4:
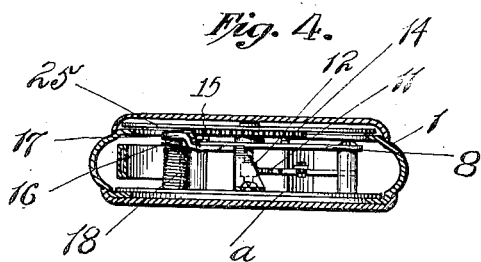
Figure 4 is a view in longitudinal section taken on line 4—4 Fig. 2.

In Figure 3 I have shown in lieu of the rotating dial an indicating hand 31 which is fastened to and rotates with the shaft 10 carrying the ratchet wheel 13. In this case the dial is fast to the case 1 and a crystal 32 is employed so that the entire dial is visible.

The operation of the gauge is thought to be apparent. The end or seat 28 is pressed against the valve of the tire, the depressor 30 engaging the valve and permitting the air to enter the tube 5. As the tube 5 expands the shaft 10 carrying the ratchet wheel 13 and dial 25 is rotated and the pressure indication showing the amount of pressure in the tire is visible through the window in the casing. The pawl engaging the teeth of the wheel holds the indication so that the same may be read after it has been removed from the valve of the tire.

In order to reset the dial or hand as the case may be, the crown 3 is depressed and the end 22 of the sliding plate 19 engages the pawl 17 rocking the latter and disengaging it from the ratchet wheel 13 thus permitting the dial or hand to regain its zero or initial position under the tension of the Bourdon tube 5.

While I have illustrated and described certain preferable embodiments of my invention I would have it understood that I am not restricted to the precise details of construction shown as the same may be departed from and still be within the scope and tenor of the appended claims.

Having thus described my invention what I claim as new herein and desire to protect by Letters Patent is:—

1. A gauge for ascertaining the air pressure in applied inflated tires comprising a Bourdon tube, a movable pressure indicating element operably connected to said Bourdon tube, means for retaining said indicating element in a position in which it is moved by said Bourdon tube, means for temporarily establishing a pressure communicating connection between the tire valve and Bourdon tube, said means including a press on resilient member, adapted to form a substantially air tight connection with the tire valve casing when pressed against it, a fixed presser foot associated with said resilient seat and adapted to depress the tire valve plunger and means operable to cause the restoration of said indicating element to zero position, said latter means including a push member operable from the exterior of the gauge casing.

2. A gauge for ascertaining the air pressure in applied inflated tires comprising a casing having metallic front and rear walls, a pressure responsive element, in the casing, an indicating disc rotatably mounted in the casing and operably connected with said pressure responsive element, said disc having pressure-indicating indicia located thereon in annular series, the front wall of said casing having a window therein through which a pressure indication predetermined by the position of the disc may be observed, means for retaining the indicating disc in the position in which it is moved by the pressure responsive element, means operable to cause the restoration of said indicating disc to zero position and means for temporarily establishing a pressure-communicating connection between the tire valve and the pressure responsive element of the gauge when the gauge is pressed against the valve stem, said last-named means including a resilient seat on the gauge adapted to form a substantially air-tight connection with the valve stem when pressed against it, and a member having a passage therethrough communicating with the pressure responsive element associated with said seat and adapted to depress the plunger of the valve.

3. A portable pressure gauge for pneumatic tires, including a casing, a seat projecting from one side of the casing and adapted to engage the valve casing of a pneumatic tire, means upon the seat for automatically opening the tire valve when the gauge is applied thereto, a tubular stem projecting from the opposite side of the casing, a cap upon the tubular stem, indicating means within the casing, means responding to pressure for operating the indicating means, means for holding the indicating means against backward movement, and a slide passing through the tubular stem and connected to the cap for releasing the indicating means.

4. A portable pressure gauge for pneumatic tires, including a casing, a seat projecting from one side of the casing and adapted to engage the air valve casing of a pneumatic tire, means upon the seat for automatically opening the valve of the pneumatic tire when the gauge is applied thereto, a tubular stem projecting from the opposite side of the casing, a finger piece applied to the tubular stem for convenience in grasping the gauge when applying the same to a tire, indicating means within the casing, means responding to pressure for moving the indicating means, means for preventing backward movement of the indicating means, a slide for releasing the indicating means, the said slide being formed with a portion which extends through the tubular stem, and a spring holding the slide normally in inoperative position.

5. A gauge for ascertaining the air pressure in applied inflated tires comprising a movable pressure indicating element, a press-on seat for engaging the valve casing, a tire valve unseating element adapted to unseat the tire valve to permit air from the tire to enter the gauge and operate the indicating element and means for retaining the indicating element in indicating position after the air has been exhausted from the gauge upon its removal from the valve casing.

6. A gauge for ascertaining the air pressure in applied inflated tires comprising a press-on seat for engaging the valve casing, a tire valve unseating element, pressure responsive member provided with an open unrestricted passage-way leading from the tire valve unseating element thereinto a pressure indicating element, and means for retaining the indicating element in indicating position after the pressure of the air is removed from the pressure responsive member.

WILLIAM P. HAMMOND.

In the presence of—
A. E. MITCHELL,
L. A. GERAU.